United States Patent [19]

Schindler et al.

[11] 3,863,037
[45] Jan. 28, 1975

[54] ELECTRICAL BOX HANGER STRUCTURE

[75] Inventors: Edgar C. Schindler, Puyallup; John C. McEachron, Tacoma, both of Wash.

[73] Assignee: Nelco Corporation, Orting, Wash.

[22] Filed: July 30, 1973

[21] Appl. No.: 384,053

Related U.S. Application Data

[60] Continuation-in-part of Ser. Nos. 265,300, June 22, 1972, abandoned, and Ser. No. 174,065, Aug. 23, 1971, , said Ser. No. 265,300, is a division of Ser. No. 69,226, Sept. 3, 1970, Pat. No. 3,701,451, said Ser. No. 174,065, is a continuation-in-part of Ser. No. 69,226.

[52] U.S. Cl. .................................... 174/58, 220/3.9
[51] Int. Cl. ............................................. H02g 3/12
[58] Field of Search .......... 174/58, 53; 220/3.9, 3.2, 220/3.3, 3.4, 3.5, 3.6

[56] References Cited
UNITED STATES PATENTS

| | | | |
|---|---|---|---|
| 982,193 | 1/1911 | Thayer | 220/3.4 |
| 982,841 | 1/1911 | Maison | 220/3.9 |
| 1,090,805 | 3/1914 | Wagner | 220/3.9 |
| 1,262,988 | 4/1918 | Sieffert | 220/3.9 |
| 2,740,873 | 4/1956 | Cronk | 174/66 UX |
| 3,353,701 | 11/1967 | Palmer | 220/3.5 |
| 3,619,476 | 11/1971 | Rasmussen | 174/58 |
| 3,773,968 | 11/1973 | Copp | 220/3.9 X |

*Primary Examiner*—J. V. Truhe
*Assistant Examiner*—David A. Tone
*Attorney, Agent, or Firm*—Ernest S. Kettelson; Harold J. Rathbun

[57] ABSTRACT

Electrical boxes molded from plastic and including hanger structures are disclosed. The hanger structures include ears that project outwardly from one side of a box and a lip that extends outwardly from another side of the box. The lip and the ears are both set back from the plane defined by the open side of the box. The ears include apertures which allow them to be attached to a stud or the like, and the lip plus the ears in combination with a cover plate create a sandwich effect which aids in stabilizing the box in a fixed position in a wallboard. A re-enforcing fillet is located at the point where the ears join their associated side. Further, a re-enforcing ridge is formed around the periphery of the ears to further re-enforce them. In addition, raised rings surround the apertures in the ears and are adapted to be driven into a wood stud or the like at the time of mounting to add additional box support. A multiple box embodiment also includes a truss-shaped top and bottom. Moreover, formed in the side of the multiple box embodiment are nail-receiving slots which allow the box to be attached to the side, as well as the front, of a wood stud. Finally, the side of the box from which the ears project may be curved to facilitate the insertion of the box through an aperture cut through existing wallboard.

15 Claims, 10 Drawing Figures

ELECTRICAL BOX HANGER STRUCTURE

RELATION TO OTHER APPLICATIONS

This application is a continuation-in-part of United States patent application Ser. No. 265,300, filed June 22, 1972 and entitled "MOLDED ELECTRICAL JUNCTION BOX" now abandoned, which in turn is a division of United States patent application Ser. No. 69,226, filed Sept. 3, 1970 now U.S. Pat. No. 3,701,451. This application is also a continuation-in-part of United States patent application Ser. No. 174,065, filed Aug. 23, 1971 and entitled "ELECTRICAL JUNCTION BOX FOR EXISTING WALL CONSTRUCTION," which in turn is a continuation-in-part of United States patent application Ser. No. 69,266, filed Sept. 3, 1970. The subject matter disclosed in said U.S. patent applications Ser. Nos. 265,300 and 174,065 is incorporated herein by reference.

BACKGROUND OF THE INVENTION

The disclosure relates to molded electrical boxes and more particularly to molded electrical boxes including hangers for mounting and stabilizing the boxes in a commercial or residential environment.

Over the years, a wide variety of electrical boxes suitable for use in residential and commercial construction have been proposed. As used herein, electrical boxes mean boxes that house electrical junctions and/or switches and receptacles. Prior to recent developments, most of these boxes were formed of metal, either iron or aluminum. Because these boxes are formed of metal, they have become increasingly expensive to manufacture.

Recently, electrical boxes molded or extruded from phenolic resins and the like have been developed and are in use. While these boxes are considerably less expensive to produce, they have other problems. The major problem with prior art molded electrical boxes relates the difficulty of providing an inexpensive adequately strong, yet easy to use, means for hanging the boxes. One approach has been to use a separate hanging means, usually formed of metal, such as illustrated in U.S. Pat. No. 3,622,029. The problem with this approach is that it makes the box more expensive to produce. Either relatively complicated molding techniques are necessary to mold the hanger into the boxes when they are formed, or the hanger must be attached by some mechanical means after the box is formed. Hence, it is more desirable to form the hanger of plastic and mold it as part of the box.

Molded electrical boxes that include hangers formed as part of the boxes when they are made have been proposed. While some boxes formed in this manner, for example, those described in U.S. Pat. No. 3,701,451, have been found to be satisfactory in some environments, they have not been satisfactory in all environments. For example, boxes of the type described in U.S. Pat. No. 3,701,451 must be installed prior to "closing" the wall in which the box is located, by wallboard or the like. If such boxes are not installed prior to this time it is almost impossible to install them later in existing walls, because the illustrated mechanism for attaching them is impossible to use. Moreover, the means for attaching these boxes is less than desirable, even when the boxes are installed prior to the walls being "closed." More specifically, boxes of the type described in U.S. Pat. No. 3,701,451 are designed to be mounted so that the surface of the open face of the boxes is flush with the outer surface of the wallboard after it is installed. This result requires that the boxes be mounted at a precise depth. However, no means is provided to hold them at the desired depth during installation. Thus, they are free to "slide" about along the side of a stud, unless a skilled installer holds them tightly in place during installation. Further, because the means for attaching these boxes only uses the adjacent stud, and not other means, such as the surrounding wallboard, for support, they are not as rigid as desirable.

Therefore, it is an object of this invention to provide a new and improved molded electrical box that includes a new and improved hanger structure.

It is a further object of this invention to provide a new and improved molded electrical box that includes a hanger molded as an integral part of the box that allows the box to be easily mounted at a desired depth.

It is yet another object of this invention to provide a new and improved plastic electric box that includes a hanger structure formed as an integral part of the box which allows the box to be mounted in a rigid manner in residential and commercial environments.

It is a still further object of this invention to provide a new and improved molded electrical box that includes a hanger molded as an integral part of the box and is suitable for installation in an existing wall without undue destruction of the wall.

It is yet still another object of this invention to provide a new and improved apparatus for hanging an electrical box that uses the wallboard surrounding the box to improve the rigidity of the box mounting.

Of the recently developed plastic boxes, many of them have been found to be adequate for single fixture installation. However, they have been found to lack stiffness and, thus, not suitable for multiple fixture installation, unless they include complex internal support webs. Consequently, it is desirable to provide an entirely open molded electrical box suitable for housing a plurality of junctions and/or electrical switches or receptacles.

Thus, it is a further object of this invention to provide a new and improved entirely open molded electrical box suitable for housing a plurality of junctions and/or electrical switches or receptacles.

It is yet another object of this invention to provide a new and improved re-enforced plastic electrical box.

SUMMARY OF THE INVENTION

In accordance with principles of this invention, new and improved electrical boxes are provided. Preferably the boxes are molded or extruded from plastic materials and are suitable for housing electrical receptacles or switches in a residential or commercial environment. The boxes include integral hanger elements formed so as to securely attach the boxes to a wooden stud or the like. The hangers include at least one ear, and preferably two ears, that project outwardly from one side of the box, but are set back from the plane defined by the open side of the box. The ears include apertures which allow the box to be fixedly attached to the "front" side of a stud by a nail or other suitable fastener. Located on the side of the box remote from the side where the ears are located is a lip. The lip is adapted to rest behind wallboard or the like, so that when a cover plate is attached to the box a sandwich is formed between the cover plate and the lip on one side, and the cover plate and the ears on the other side of the box. The sandwich arrangement securely supports the box in position and assists in preventing it from moving when a switch is opened or closed, or a plug is inserted into or removed from a receptacle, as the case may be, depending upon the electrical component being housed in the box.

In accordance with other principles of this invention, a fillet is formed at the junction between the ears and the side of the box from which the ears project to add shear strength at this junction. Further, the "front" side of the ears include a reenforcing ridge along their periphery. In addition, a gusset is formed between the lip and the side of the box from which the lip projects.

In accordance with further principles of this invention, rings surround the apertures in the ears on the "rear" side thereof. The rings are adapted to be driven into a wood stud or the like to provide additional stability.

In accordance with still other principles of this invention, integral flanges are formed in the box on the side thereof from which the ears project. The flanges are generally co-planar with this side and include apertures which may be open on one side and, thus, adapted to receive nails and the like. These apertures allow nails to be driven into the side of a stud, as well as into the front of the stud, through the apertures in the ears. This structure is of particular benefit when the box is a multiple, as opposed to a single, box, because it increases the support given to the box by the stud.

In accordance with the further principles of this invention, multiple boxes are formed which include truss-shaped tops and bottoms. Ths truss shape of the tops and bottoms adds strength to the box without unduly complicating the overall structure. Preferably, the truss shape is creating by forming a "step" in the top and in the bottom of the box.

In accordance with the other principles of this invention, the side of the box from which the ears project is curved to facilitate the insertion of the box through an aperture cut through existing wallboard.

In accordance with alternate principles of this invention, the lip is created by a step in the side of the box remote from the ears, the step being formed by an offset area which increases the internal volume of the box.

It will be appreciated from the foregoing brief summary that new and improved molded electrical boxes are provided by the invention. Even though the boxes are formed of plastic, or plastic-like materials, the hangers formed as integral portions of the box are strong enough to allow the box to be securely fastened in place. More specifically, the inclusion of uniquely formed integral ears allows the boxes to be inexpensively formed with a hanger that will not easily break away from the box during mounting or subsequent use. Further, the provision of an integral lip on the side remote from the side from which the ears project allows the surrounding wallboard to aid in securing the box so that it cannot be subsequently "wiggled" or "jiggled" during switch operation, or insertion or removal of a plug, as the case may be. Moreover, the inclusion of integral flanges with nailing slots, particularly in larger boxes, in addition to the hanger ears, provides additional means of securing such boxes in position. Furthermore, the inclusion of trusses in the long tops and bottoms of larger boxes allows these boxes to be entirely formed of plastic, or plastic-like materials, without undue loss of structural strength. That is, the inclusion of trusses in the tops and bottoms of larger boxes allows them to be completely open without loss of the structural strength necessary for them to serve their intended functional application and meet present electrical code requirements. Finally, curving the side of the box from which the ears project allows the box to be inserted into an already existing wall without removing a large portion of the wallboard surrounding the area where the box is to be mounted. Hence, the invention overcomes many of the prior art problems discussed above.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENTS

Figure 1:
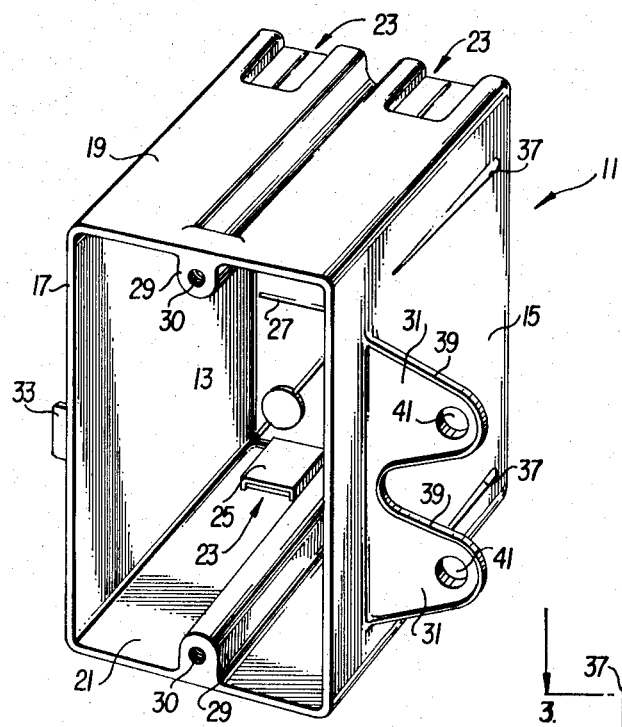
FIG. 1 is a pictorial diagram of an electrical box formed in accordance with the invention.

FIG. 1 illustrates a preferred embodiment of the invention and comprises an electrical junction box 11 that includes a rear wall 13, right and left side walls 15 and 17, and top and bottom walls 19 and 21. In a conventional manner, the front of the box 11 is planar and open. Preferably, the box is molded or extruded from a plastic material, such as phenolic resins and the like. Because it is molded, the box 11 is slightly narrower at its rear than it is at its front because a draft angle must be included or the box cannot be removed from its mold after it is formed.

Formed or molded in the top and bottom of the box 11 are knockout regions 23. When portions of the knockout regions are removed, as explained in U.S. Pat. No. 3,701,451, electrical wires can pass through the thusly created apertures into the interior of the box.

Molded into the top and bottom walls of the box 11 are lugs 29. The lugs include apertures 30 adapted to receive the screws which are normally used to mount an electrical switch or receptacle in a box.

Figure 3:
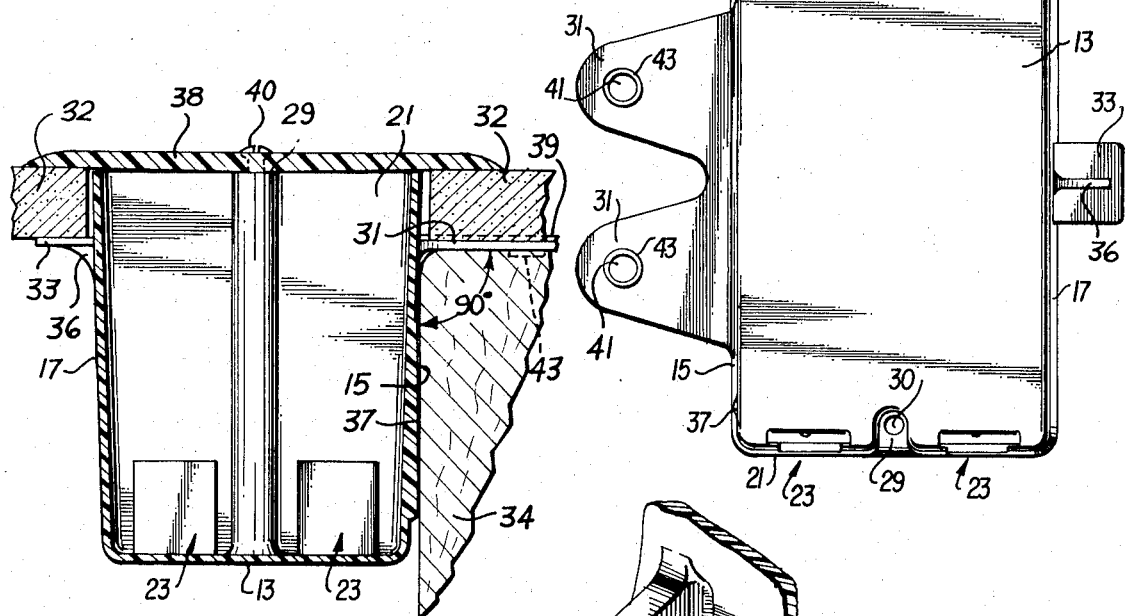
FIG. 3 is a cross-sectional diagram along line 3—3 of FIG. 2, and, in addition, illustrates the mounting of an electrical box formed in accordance with the invention in a wall.

Projecting outwardly from the right side wall 15 of the box 11 and molded as an integral part of the box are two planar ears 31 which, along with an integral planar lip 33, projecting outwardly from the left side of the box 11 and also molded as part of the box, form a hanger structure. The ears 31 and the lip 33, as seen best in FIG. 3, are recessed from the plane defined by the front of the box 11 by an amount equal to the thickness of a wallboard material 32, such as gypsum board. In this manner, as will be better understood from the following description, the plane defined by the front of the box will lie in the plane of the wallboard after installation.

Figure 4:
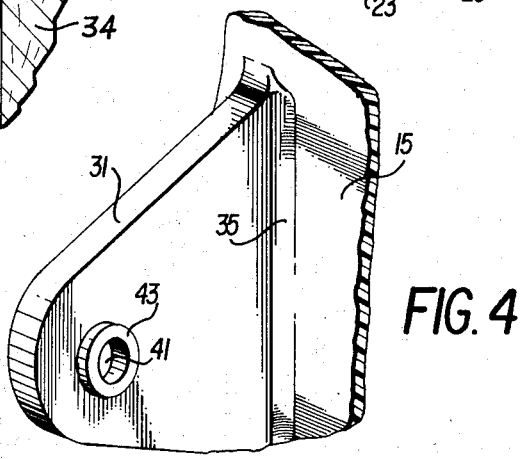
FIG. 4 is a partially pictorial diagram illustrating one of the ears of the hanger mechanism of the invention.

As best seen in FIG. 4, a fillet 35 is molded into the overall structure at the point where the ears 31 join the right side 15 of the box 11. The fillet 35 is located on the "back" side of the ears 31. The fillet adds shear strength at the junction between the ears and the right side of the box. Because the standard two-by-four stud is slightly rounded at its corners, this fillet does not prevent the box from being tightly attached to the corner of a two-by-four stud 34, as illustrated in FIG. 3.

In order for the box 11 to fit snugly against a side and the "front" of a two-by-four stud at its corner, and yet remain flush with the face of the wallboard, as indicated above, a pair of ribs 37 are integrally formed at the right side of the box 11. The ribs rest against the side of the two-by-four and compensate for the draft angle discussed above. Thus, the angle between the outer surface of the ribs 37 and bottom of the ears 31 is 90°, as illustrated in FIG. 3.

Molded as part of the ears, on the "front" side thereof, is a raised ridge 39. The raised ridge 39 is located along the periphery of the ears and adds strength to the ears without making them unduly thick. Because the ridge is thin, it will tend to become indented into the back of the wallboard when the wallboard is installed about the box 11 in a conventional manner, as illustrated in FIG. 3.

Formed in the ears 31 are apertures 41. The apertures allow the ears to be attached to the "front" of the stud 34 by nails or other suitable mechanical attaching means. Molded into the back of the ears, about the apertures 41, are raised ridges 43, best seen in FIG. 2 and 4. The raised ridges 43 are narrow and are adapted to be driven or indented into the stud when the box is mounted on the stud by driving a suitable mounting means, such as nails, through the apertures 41. The raised ridges 43 tend to prevent movement of the box should the nails be somewhat smaller than the size of the apertures in addition to strengthening the ear region surrounding the apertures.

Also molded as an integral part of the overall structure is a gusset 36. The gusset 36 is located at the "rear" of the lip 33 between the lip and the side of the box from which the lip projects. The gusset adds structural strength to the lip 33.

As indicated above, the lip 33 and the ears 31 are set back from the plane defined by the open face of the box. The amount of set-back is determined by the thickness of the wallboard 32 to be used with the box. More specifically, the box is first mounted on a stud 34 in the manner described above and illustrated in FIG. 3. Thereafter, in a conventional manner, electrical wiring work is performed. At this time, or after the wallboard is installed, as desired, a receptacle or switch, as the case may be, is mounted in the box by attachment to the lugs 29, as discussed above. Thereafter, the wall in which the box is mounted is enclosed by suitable wallboard, such as gypsum board or the like. At this point, the front of the box is flush with the surface of the wallboard 34. After the wallboard has been finished, as desired, a plate 38 is attached to the switch or receptacle by screws in a manner well known in the art. Alternatively, as specifically illustrated in FIG. 3, if no receptacle or switch is to be mounted in the box (i.e., the box is a mere junction box), the cover plate 38 is attached directly to the lugs 29 by suitable screws 40, as is also well known in the art.

The cover plate, regardless of its nature, is somewhat larger in surface area than is the opening into the box. Thus, as illustrated in FIG. 3, the cover plate presses against the wallboard 32 around the periphery of the front opening of the box. This pressing action causes the lip 33 and the ears 31 to tightly press against the rear surface of the wallboard. Thus, the wallboard is "sandwiched" between the lip and the ears on one side, and the plate on the other side. In this manner, in addition to the support created by attaching the box to the stud, additional support for the box and its associated items is provided by the wallboard itself. Thus, the box is securely fastened in place and is prevented from "wiggling" when a plug is inserted or withdrawn or when a switch is opened or closed, as often occurs with prior art boxes. Moreover, no complicated mounting mechanism is required. The box can be formed entirely of plastic without loss of the strength necessary to provide adequate support. Further, no separate metal or other type of support structure is necessary. Hence, the box is inexpensive to create using conventional plastic molding techniques. Yet, it is adequately rugged and, thus, suitable for widespread use. Preferably, the lip is approximately one-half inch by approximately one-half inch in size, and may be about one-sixteenth inch thick.

Figure 5:
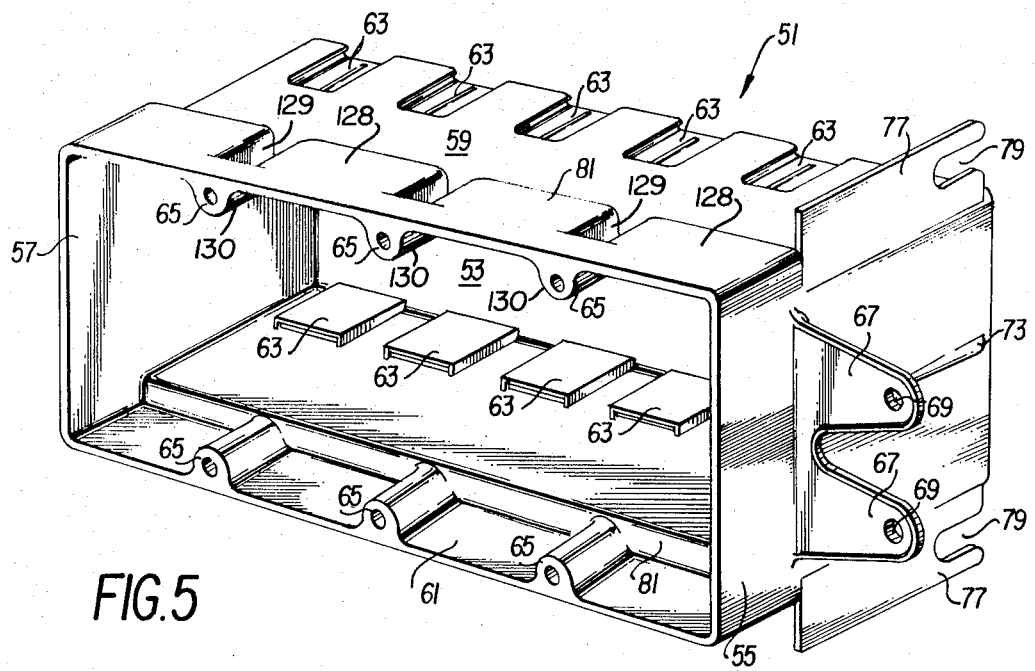
FIG. 5 is a pictorial diagram illustrating an alternate embodiment formed in accordance with the invention and in particular a box suitable for housing a plurality of electrical devices such as electrical receptacles or switches.
Figure 6:
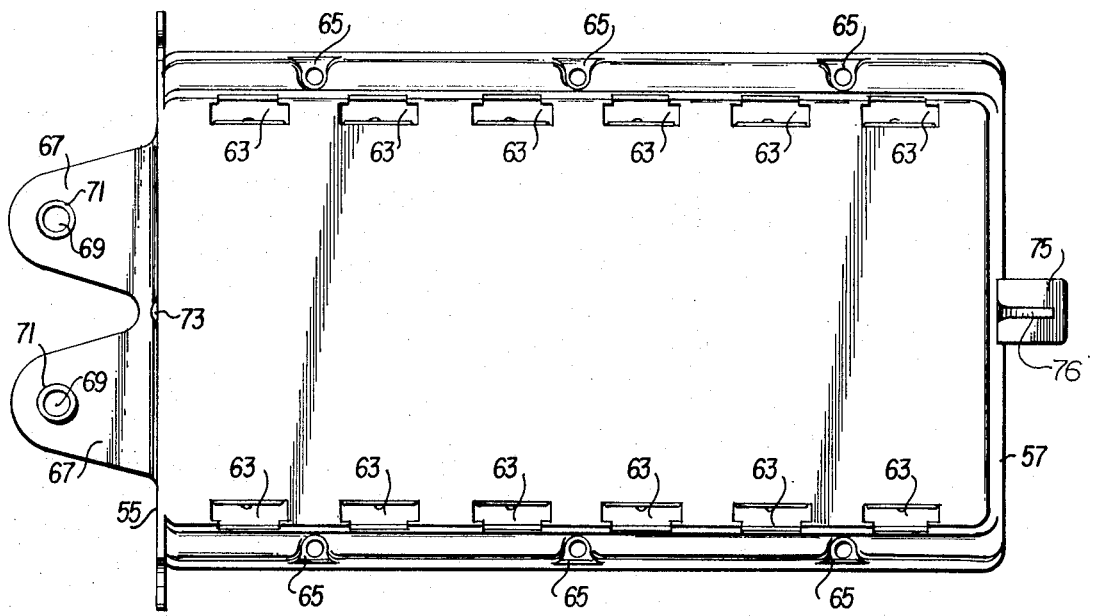
FIG. 6 is a rear view of a box of the type illustrated in FIG. 5.

FIGS. 5 and 6 illustrate an alternative embodiment of the invention suitable for housing a plurality of receptacles and/or switches. As with the embodiment illustrated in FIGS. 1-3, the box 51 illustrated in FIGS. 5 and 6 includes a rear wall 53, right and left side walls 55 and 57, a top wall 59 and a bottom wall 61. Located in the top and bottom walls are a plurality of knockout regions 63 similar to the knockout regions 23 illustrated in FIGS. 1-3 and previously described. In addition, a plurality of lugs 65 to which electrical receptacles or switches can be attached, as described above, are provided.

Molded in the right side wall 55 are a pair of integral ears 67 formed similar to the ears 31 illustrated and described above. That is, the ears include a rear fillet formed at the junction between the ears and the right wall, and a raised ridge formed about the periphery of the ears on the front side thereof. Moreover, formed in the ears 67 are apertures 69 and formed around the apertures are raised ridges 71 which can be driven into a wooden stud or the like. Further, formed in the right wall "behind" the ears 67 is a ridge 73 which compensates for the draft angle discussed above. Located on the left side of the box 51 and recessed from the front thereof is an integral lip 75 which performs the same function as the lip 33 (FIGS. 1–3) discussed above. The integral lip 75 is rigidized by a gusset 76. Hence, the box illustrated in FIGS. 5 and 6 includes the same features as the box illustrated in FIGS. 1–3. In addition, as hereinafter described, the box includes additional features.

Located on the right side of the box 51 are two integral flanges 77. The flanges are located at the corners where the right wall 55 joins the top and bottom walls 59 and 61, and extend rearwardly from the point where the ears are located. The flanges 77 are generally coplanar with the right wall 55 and specifically lie in a plane orthogonal to the rear surface of the ears 67. This plane is the plane in which the top of the draft compensating ridge 73 lies. The flanges 77 include slots 79 towards their rear. These slots 79 are adapted to allow nails to be driven into the side of a two-by-four stud. That is, it will be appreciated that when the box 51 is located at the corner of a two-by-four stud, nails can be driven, through the apertures 69 formed in the ears, into the "front" of the stud, as discussed above. In addition, the flanges 77 allow nails to be driven through slots 79 into the side of the stud. In this manner, thet box is securely attached to the corner of the stud. The slots 79 may be closed (i.e., holes) rather than open, as illustrated, if desired.

Figure 2:
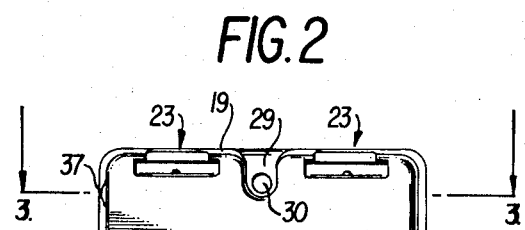
FIG. 2 is a rear view of an electrical box of the type illustrated in FIG. 1.

In addition to the inclusion of flanges, the other main difference between the box illustrated in FIGS. 5 and 6 and the box illustrated in FIGS. 1–3 relates to the formation of the top and bottom walls 59 and 61. More specifically, the top and bottom walls include truss-shaped regions 81. The truss-shaped regions 81 are in essence steps in these walls which greatly improve their strength. That is, rather than having the top and bottom walls perfectly planar whereby they could be easily compressed toward or away from one another and thus distorted in shape, the top and bottom walls are stepped. The step forms a truss which prevents the top and bottom walls from being easily collapsed toward or away from one another. Hence, even though the top and bottom walls are relatively long, they are also relatively stiff and rigid.

The truss-shaped regions 81 may be structurally described as raised regions. FIG. 5 illustrates four such truss shaped or raised regions 81 formed in the top and bottom walls, including a lateral wall portion 128 forming the top or outer portion of each raised region 81 lying in a first lateral plane, a depending wall 129 extending inwardly from each edge of the lateral wall portion 128 except the front edge, each depending wall lying in a plane which intersects the said first lateral plane. Each depending wall 129 which faces a like depending wall of an adjacent raised region or truss-shaped region 81 is integrally joined therewith at a contoured portion 130 of the wall formed along the inward edge region of each depending wall 129 facing another depending wall 129, such contoured portion 130 serving to space the raised or truss-shaped regions 81 apart as well as to provide a bounding wall within which to form said lugs 65.

The boxes previously described are adapted for mounting prior to a wall being "closed" by wallboard and the like. However, in many instances, it is desired to mount a box in an existing wall. While a box of the type illustrated in FIGS. 5 and 6 (i.e., a multiple receptacle or switch box) can be mounted in an existing wall without removing a portion of the wall much greater than that normally necessary if the box were mounted prior to wall closure by merely "angling" the box during insertion through an opening slightly larger than the area defined by the "front" at the box, a box of the type generally illustrated in FIGS. 1–3 cannot be inserted through an opening in such a manner. However, as illustrated in FIGS. 7–10 and hereinafter described, the invention provides single receptacle or switch boxes which can be mounted in an existing wall without removing a large portion of the wall to allow mounting and without loss of the beneficial features of the invention.

Figure 7:
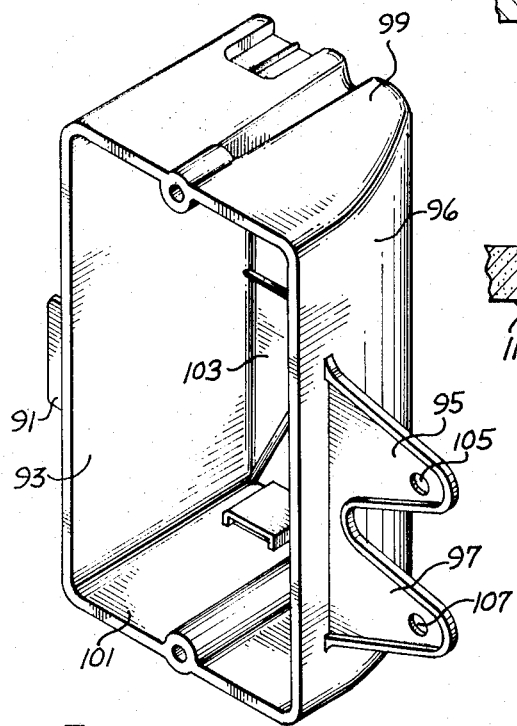
FIG. 7 is a pictorial diagram illustrating a further alternate embodiment formed in accordance with the invention and in particular a box suitable for insertion in an existing wall.

FIG. 7 illustrates a box generally similar to the box illustrated in FIGS. 1–3, in that it includes a lip 91 projecting outwardly from a left side wall 93 and a pair of ears 95 and 97 projecting outwardly from a right side wall 96. The box also includes a top wall 99 and a bottom wall 101, plus a rear wall 103. The lip 91 and the ears 95 and 97 are recessed from the plane defined by the opening in the "front" wall of the box illustrated in FIG. 7. In addition, raised ridges surrounding the periphery of the ears 95 and 97 are provided, as are raised ridges surrounding apertures 105 and 107 in the ears 95 and 97. Moreover, a gusset is located between the rear of the lip 91 and the left side 93.

Figure 8:
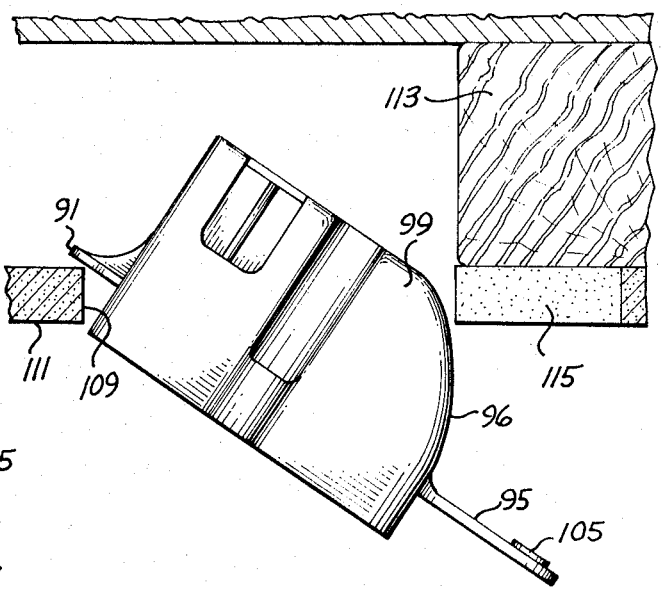
FIG. 8 is a partially cross-sectional and partially pictorial diagram illustrating a box of the type illustrated in FIG. 7 being inserted into an existing wall.

The primary difference between the box illustrated in FIG. 7 and the box illustrated in FIGS. 1–3 is that the side wall from which the ears 95 and 97 project curves rearwardly towards the rear wall 103 starting at a point where the ears 95 and 97 intersect that side wall. The curved side wall allows the box to be readily inserted into an existing wall, as illustrated in FIG. 8. More specifically, an aperture 109 is cut into the wallboard 111 on the "access" side of the wall adjacent to a stud 113. In addition, a portion of the wallboard, in the region 115, is removed from the front of the stud 113. Removal of the portion in region 115 is necessary to allow the ears 95 and 97 to lie against the "front" of the stud 113. The aperture 109 is approximately the same size as, or slightly larger than, the area defined by the top and bottom walls 99 and 101, and the right and left side walls 93 and 96. Thus, the "front" of the box, after it is inserted into the wall by rotating the box inwardly as illustrated in FIG. 8, is surrounded by the wallboard 109 just as if the wallboard were installed after the box had been mounted, with the exception of the additional portion removed in region 115. After installation, this region is covered by a suitable plaster compound or the like.

While a box of the type illustrated in FIGS. 7 and 8 is suitable for use in many environments, in some environments it may be desirable not to remove any more of the wallboard than absolutely necessary, such as would be the case if the wallboard were wood paneling, for example. In such situations, a box of the type illustrated in FIG. 9 can be utilized.

Figure 9:
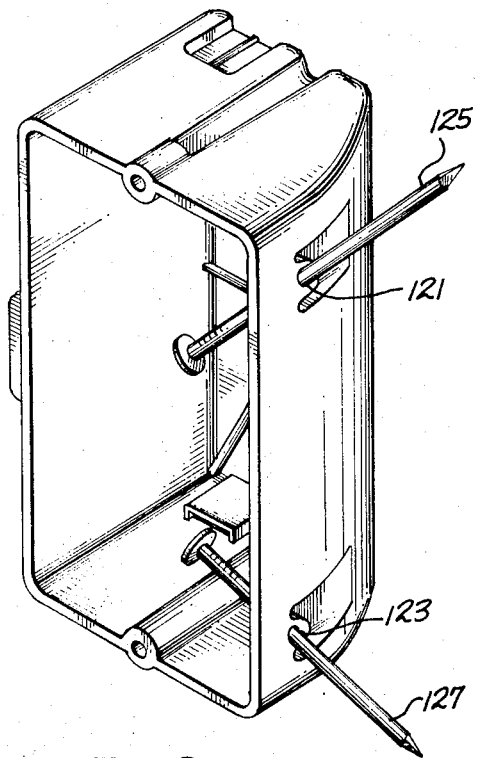
FIG. 9 is a pictoral diagram illustrating another alternate embodiment formed in accordance with the invention and suitable for insertion into an existing wall; and, FIG. 10 is a pictorial diagram illustrating still another alternate embodiment formed in accordance with the invention and suitable for insertion into an existing wall.

The box illustrated in FIG. 9 is identical to the box illustrated in FIGS. 7 and 8, with the exception that the ears 95 and 97 are not included. Rather, an alternate box attachment means comprising a pair of reinforced apertures 121 and 123 which pass through the curved side of the box are provided. The reinforced apertures allow nails 125 and 127 to be driven from the inside of the box into an adjacent stud. Because after mounting the box remains surrounded by the wallboard, the additional rigidity provided by the sandwich effect created between the outwardly projecting lip, and the cover plate, is retained.

Figure 10:
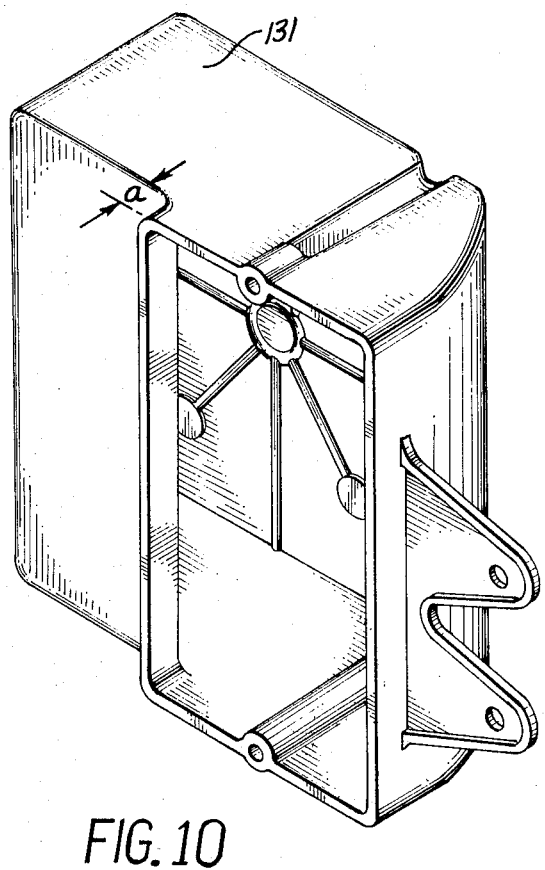

FIG. 10 illustrates a further alternate embodiment of the invention suitable for insertion into an existing wall. Specifically, the embodiment of the invention illustrated in FIG. 10 is substantially identical to the embodiment of the invention illustrated in FIGS. 7 and 8, with the exception that the lip 91 has been eliminated. In FIG. 10 the lip 91 has been replaced by an offset region 131 that extends outwardly from the left side of the box and, thus, increases the internal volume of the box. The outwardly extending box region 31 is offset by the distance $a$. The distance $a$ is equal to the distance of the lip was recessed in the previously described embodiments of the invention. Because the side from which the ears project outwardly remains curved, the box illustrated in FIG. 10 can be easily inserted into an existing wall through an aperture equal to, or slightly larger than, the area defined by the periphery of the "front" of the box.

It will be appreciated from the foregoing description that the invention provides electrical boxes which are preferably formed of plastic. The boxes can be utilized to support a single or a multitude of electrical sockets or switches, as desired. Even though a multitude of sockets or switches are supported, the invention provides adequate strength without undue weight or complexity. Moreover, the invention utilizes a means for supporting the structure both adjacent to a stud and in a sandwich manner without the use of a complicated mechanism. That is, rather than providing a separate hanger structure, the hanger structure of the invention can be formed simultaneously with the formation of the plastic boxes. Yet, even though the hanger structure is formed of plastic, as are the boxes, the overall structure due to its unique method of formation is adequately strong. Further, boxes formed in accordance with the invention can be either mounted prior to the closure of a wall by wallboard or the like or can be mounted in an existing wall.

While preferred embodiments of the invention have been illustrated and described, it will be appreciated by those skilled in the art and others that various changes can be made therein without departing from the spirit and scope of the invention. For example, while FIG. 5 illustrates a box for housing three electrical receptacles and/or switches, the inventive structure can be formed so as to support a lesser or greater number of such items. Moreover, the flanges and truss-shaped top and bottom walls illustrated in FIG. 5 in a multiple box can be formed in a single box of the type illustrated in FIGS. 1-3 and 7-10, if desired. Hence, the invention can be practiced otherwise than as specifically described herein.

The embodiments of the invention in which an exclusive property or privilege is claimed are defined as follows:

We claim:

1. An electrical box comprising a box molded from a plastic material, said box having a rear wall and side walls that define a chamber, said side walls defining a planar open front wall which allows access to the interior of said chamber, a hanger structure molded as part of said box, said hanger structure comprising planar ear means extending outwardly from one of said side walls and integrally molded therewith, said planar ear means lying in a plane parallel to and spaced apart rearwardly from the plane of said open front wall, including a ridge projecting normally from said planar ear means integrally formed about the periphery of said planar ear means on the side thereof nearest said open front wall of said box, apertures in said planar ear means, and integral raised ridges located about the peripheries of said apertures in said planar ear means projecting normal thereto from the opposite side of said planar ear means nearest the rear wall of said box.

2. An electrical box as claimed in claim 1 wherein said side walls are four in member, including top and bottom walls, and join at corners; and, including at least one apertured flange that extends in a plane which laterally intersects the surface plane of said planar ear means to provide cooperative hanger means to cooperatively abut adjacent sides of a mounting stud member of rectangular cross section, the apertures in said apertured flange positioned a substantially different distance from the intersection point of said planes than the apertures in said planar ear means.

3. An electrical box as claimed in claim 2, including a raised ridge formed in the wall from which said planar ear means extend outwardly, the outermost surface of said raised ridge being substantially normal to the plane defined by said planar ear means, said surface being blunt to provide bearing means which avoid penetrating a wood stud member when urged thereagainst under applied force for mounting.

4. An electrical box as defined in claim 3, wherein at least one side wall of said box includes integrally formed support means, said support means including a first lateral wall portion lying in a first lateral plane, depending wall means lying in an intersecting plane which intersects said first lateral plane, said depending wall means integrally joining and spacing said first lateral wall portion from other lateral portions of said wall to thereby provide a raised region in said wall.

5. An electrical box as claimed in claim 4, wherein said depending wall means includes a depending wall integrally joined at a first end with said first lateral wall portion and extending normal thereto, a second lateral wall portion lying in a second lateral plane, said first and second lateral planes being spaced apart and substantially parallel, said depending wall being integrally joined at a second end with said second lateral wall portion to thereby provide a step.

6. An electrical box as claimed in claim 5, wherein said box includes two elongated parallel side walls, each of said elongated side walls including a plurality of said raised regions integrally formed therein, and each of said side walls including a step integrally formed therein, to provide integrally supported elongated side walls in said box to house more than one electrical item.

7. An electrical box including a rear wall and side walls that define a chamber, said side walls defining a planar open front wall, planar ear means extending outwardly from one of said side walls and integrally molded therewith, said planar ear means lying in a plane parallel to and spaced apart rearwardly from the plane of said open front wall, a planar lip extending outwardly from a side wall remote from the side wall from which said planar ear means extends outwardly, said lip lying in essentially the same plane as the plane in which said planar ear means lies, wherein the side walls are four in number, including top and bottom side walls, and wherein one of said top and bottom side walls includes an integrally formed raised region having a lateral surface and depending wall means integrally joining said raised region to said wall.

8. An electrical box as claimed in claim 7 wherein both of said top and bottom side walls include said integrally formed raised regions.

9. An electrical box as claimed in claim 8, wherein said box includes elongated top and bottom side walls to house more than one electrical item.

10. An electrical box as claimed in claim 9 wherein the plane in which said planar ear means lies is spaced rearwardly from the plane in which said open front wall lies.

11. An electrical box as claimed in claim 10 wherein said planar ear means includes two co-planar ears, and apertures in each of said ears.

12. An electrical box as claimed in claim 11 including a fillet formed at the junction between said ears and the side wall from which said ears extend, said fillet being molded integrally with said wall and said ears along said junction and on a first side of said ears, said first side facing away from said open front wall, said fillet having an exterior surface conformed to bound the slightly rounded corner between the respective sides of a stud member against which said ears and said adjoining side wall abut, and, a gusset located between said lip and the side wall from which said lip extends, said gusset being molded integrally with said wall and said lip on a first side of said lip, said first side facing away from said open front wall.

13. An electrical box as claimed in claim 12 including a ridge projecting normally from said planar ear means integrally formed about the periphery of said ears on the side thereof nearest said open front wall of said box and integral raised ridges located about the peripheries of said apertures in said ears projecting normal thereto from the opposite side of said ears nearest the rear wall of said box.

14. An electrical box as claimed in claim 13 including at least one apertured flange that extends in a plane which laterally intersects the plane of said ears and said lip to provide cooperative hanger means to cooperatively abut adjacent sides of a mounting stud member.

15. An electrical box including a rear wall and side walls that define a chamber, said side walls defining a planar open front wall, planar ear means extending outwardly from one side of said side walls and integrally molded therewith, said planar ear means lying in a plane parallel to and spaced apart rearwardly from the plane of said open front wall, a planar lip extending outwardly from a side wall remote from the side wall from which said planar ear means extends outwardly, said lip lying in essentially the same plane as the plane in which said planar ear means lies, the side wall from which said planar ear means extends curves inwardly toward said rear wall.

* * * * *